United States Patent
Mair

(10) Patent No.: US 8,556,776 B2
(45) Date of Patent: Oct. 15, 2013

(54) METHOD FOR PROVIDING ASSISTANCE TO A DRIVER OF A VEHICLE DURING A STARTING PROCESS

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 406 days.

(21) Appl. No.: 13/050,140

(22) Filed: Mar. 17, 2011

(65) Prior Publication Data

US 2011/0259679 A1    Oct. 27, 2011

(30) Foreign Application Priority Data

Apr. 22, 2010    (DE) .......................... 10 2010 028 074

(51) Int. Cl.
  *B60W 10/06*    (2006.01)
  *B60W 10/18*    (2012.01)
(52) U.S. Cl.
  USPC ........................................................ 477/184
(58) Field of Classification Search
  USPC .......................................... 477/184, 195, 906
  See application file for complete search history.

(56) References Cited

U.S. PATENT DOCUMENTS

| 5,916,062 | A * | 6/1999 | Siepker | 477/194 |
| 7,074,161 | B2 * | 7/2006 | Diebold et al. | 477/184 |
| 2010/0094513 | A1 * | 4/2010 | Mair | 701/48 |

FOREIGN PATENT DOCUMENTS

| DE | 43 32 459 A1 | 3/1995 |
| DE | 102 00 783 A1 | 7/2003 |
| DE | 10 2004 056 413 A1 | 5/2006 |
| DE | 10 2008 007 714 A1 | 9/2008 |
| WO | 2006/056501 A1 | 6/2006 |

* cited by examiner

*Primary Examiner* — Edwin A Young
(74) *Attorney, Agent, or Firm* — Davis & Bujold, PLLC; Michael J. Bujold

(57) ABSTRACT

In the method for providing assistance to the driver of a motor vehicle, in particular a motor vehicle comprising a semi-automatic or an automatic transmission, it is recognized, during the starting process, whether the holding torque of the vehicle is greater than the engine intake torque in the current gear. In the event that a current torque is greater than the engine intake torque in the current gear or if no gear is engaged or called for, in the first forward gear, emitting a signal which indicates to the driver the need to use the holding brake of the vehicle and/or a transmitting a signal to the brake control system of the vehicle to impose a brake pressure in the service brake and/or in the holding brake.

8 Claims, No Drawings

METHOD FOR PROVIDING ASSISTANCE TO A DRIVER OF A VEHICLE DURING A STARTING PROCESS

This application claims priority from German patent application serial no. 10 2010 028 074.7 filed Apr. 22, 2010.

FIELD OF THE INVENTION

The invention relates to a method for providing assistance to the driver of a motor vehicle, in particular a motor vehicle comprising a semi-automatic or automatic transmission, during starting processes.

BACKGROUND OF THE INVENTION

In the case of motor vehicles, in particular ones with not very high engine power or motor vehicles with a manual-shift transmission, a semi-automatic or an automatic transmission with a low gear ratio which can, for example, be the case because the number of gears is small, a problem can arise that, under certain boundary conditions, starting is not possible solely with the engine intake torque. To enable starting in such a situation, a "turbine torque", i.e., a boost pressure must be built up. In this way the boost pressure is built up by loading the engine with a time delay or at a climbing speed; so that there is a period during which the vehicle can roll backward because the driving force is lower than the driving resistance.

As a rule, before a starting process the driver cannot tell whether the vehicle will roll backward and that he should, therefore, apply the holding brake, and from which point in time he can release the holding brake without the vehicle rolling back.

This problem does not arise with vehicles having a starting aid or a roll-back preventer ("Hill holder"), since undesired rolling backward is prevented by, for example, co-operation of the transmission and the service brake. However, a prerequisite for most starting aids in motor vehicles is a correspondingly equipped brake system, which is not the case in the majority of vehicles. Furthermore, in most motor vehicles starting aids are an option which adds to the cost.

DE 10 200 783 C2 describes a starting-aid control device for use in a vehicle that comprises a manual-shift transmission, a holding brake, in particular an electro-mechanical or hydraulic holding brake, one or more detector devices for receiving signals, an evaluation unit for forming a signal that indicates a desire to start, and a control unit. In this case, when a signal indicating a wish to start occurs, a control element is actuated by the control unit in such manner that the holding brake is released and the evaluation unit evaluates a starting return-signal of the vehicle to determine the starting time; the parameters of inclination angle and wheel torque are evaluated to determine too early and/or too late an opening of the holding brake.

By virtue of the known starting-aid control device, by the evaluation of a few signals a starting process on a slope should be made easier since, by means of the starting-aid control device, a wish to start is recognized. Disadvantageously, however, this requires a brake system of complex structure that can be controlled by a control unit.

SUMMARY OF THE INVENTION

The purpose of the present invention is to indicate a method for providing assistance to the driver of a motor vehicle, in particular a motor vehicle comprising a semi-automatic or automatic transmission, during starting processes by implementing which, preferably without the need for a starting aid or means for the prevention of rolling backward, it is ensured that no undesired backward rolling of the vehicle will occur.

DETAILED DESCRIPTION OF THE PREFERRED EMBODIMENTS

According to these, a method is proposed for providing assistance to the driver of a motor vehicle, in particular a motor vehicle comprising a semi-automatic or an automatic transmission, during starting processes, in which it is recognized whether the holding torque of the vehicle is larger than the engine intake torque in the gear engaged at the time.

The holding torque corresponds to the driving resistance back-computed by taking into account the current gear ratio and the efficiency of the drivetrain on the clutch or on the engine of the vehicle.

According to the invention, it is provided that when a current holding torque is recognized as being larger than the engine intake torque in the current gear or, in the case when no gear is engaged or called for, in the first forward gear, with the result that the necessary starting torque cannot be provided spontaneously, a signal is emitted which indicates to the driver the need to use the holding brake.

In a variant of the method according to the invention, it can be provided that the signal indicating the need to use the vehicle's holding brake when on an uphill slope is emitted, regardless of the value of the current holding torque, always at or above a certain limit value of the gradient. The gradient is preferably recognized with reference to an inclination sensor of the vehicle.

When the vehicle is at rest, the signal can be emitted as soon as a gear has been engaged or called for or, alternatively, regardless of the current gear or of a shift process in the transmission, when the vehicle is at rest.

According to a further development of the invention, it is provided that if during the starting process sufficient engine torque has been built up to compensate the holding torque, another or a different signal is emitted, which indicates to the driver that the holding brake of the vehicle can be released without the risk of rolling back. This prevents the vehicle from tending to roll back because the holding brake has been released too early.

The emitted signal can be a visual, acoustic and/or tactile signal. Preferably, the driver is alerted to the need to use the holding brake of the vehicle by blinking of the holding brake symbol which is, in any case present, or of the check-light for the holding brake. When the holding brake is actuated, the holding brake symbol or check-light shines continuously, whereas when it should be indicated to the driver that the holding brake of the vehicle can be released without risk of rolling back, the holding brake symbol or check-light for the holding brake blinks.

Accordingly, the blinking of the holding brake symbol or check-light indicates the need to change the condition of the holding brake, whereas the conditions "holding brake not actuated" and "holding brake actuated" are indicated by the conventional signs "holding brake symbol or check-light continuously off" and "holding brake symbol or check-light continuously on", respectively. In addition to the blinking of the holding brake symbol or check-light for the holding brake, an acoustic and/or tactile signal can be emitted.

Alternatively to the definition of the visual signal as blinking of the holding brake symbol or check-light, the visual signal can be defined as the blinking of some other characteristic symbol or a check-light, or as the activation of a corresponding text display.

According to a further development of the invention, when a current holding torque is recognized as being larger than the engine intake torque in the current gear, or if no gear is engaged or called for, in the first forward gear, with the result that the necessary starting torque cannot be provided spontaneously, then in addition or alternatively to the emission of a signal alerting the driver to the need for using the holding brake of the vehicle, a signal can be transmitted to the vehicle's brake control system to control the brake pressure in the service brake and/or in the holding brake.

In that case a brake pressure of the service brake and/or the holding brake is imposed as a function of the current engine torque built up, in such manner that the vehicle cannot roll back; when the engine torque can compensate the holding torque, the imposed brake pressure falls to zero.

Thanks to this concept, in contrast to the starting-aid systems known from the prior art the service brake and/or the holding brake are activated selectively instead of prolonging the holding duration of the brake already activated by the driver, with the result that passenger safety is increased.

This method variant can also be carried out in vehicles with manual-shift transmissions, if they have an appropriate control system.

The invention claimed is:

1. A method for providing assistance to a driver of a motor vehicle comprising, one of a semi-automatic and an automatic transmission, during a starting process, the method comprising the steps of:
   during the starting process, recognizing whether a holding torque of the vehicle is greater than an engine suction torque in a current gear, and, if it is recognized that the holding torque is greater than the engine suction torque in the current gear, or if it is recognized that no gear is engaged or called for in a first forward gear,
   at least one of emitting an emitted signal indicating to the driver a need to engage a holding brake of the vehicle, and transmitting a system signal to a brake control system of the vehicle to impose a brake pressure on at least one of a service brake and the holding brake.

2. The method for providing assistance to the driver of the motor vehicle during the starting process according to claim 1, further comprising the step of when sufficient engine torque has been built up during the starting process to compensate the holding torque, emitting another signal which indicates to the driver that the holding brake can be released without risk of the vehicle rolling backward.

3. The method for providing assistance to the driver of the motor vehicle during the starting process according to claim 1, further comprising the step of adjusting at least one of the brake pressure of the service brake and the brake pressure of the holding brake as a function of the engine torque currently built up so as to prevent the vehicle from rolling backward and, when the engine torque built up can compensate the holding torque, permitting the brake pressure to fall to zero.

4. The method for providing assistance to the driver of the motor vehicle during the starting process according to claim 1, further comprising the step of using one of a visual, an acoustic and a tactile signal as the emitted signal.

5. The method for providing assistance to the driver of the motor vehicle during the starting process according to claim 1, further comprising the step of alerting the driver of the need to use the holding brake of the vehicle by blinking of one of a present holding brake symbol and a holding brake check-light so that when the holding brake is actuated, the holding brake symbol or the check-light is continuously illuminated, and indicating to the driver that the holding brake of the vehicle can be released without a risk of rolling back, by blinking of the holding brake symbol or the check-light for the holding brake.

6. The method for providing assistance to the driver of the motor vehicle during the starting process according to claim 1, further comprising the step of emitting a visual signal as the emitted signal, and the visual signal comprising one of blinking of a characteristic symbol or a special check-light, or activation of a corresponding text display.

7. The method for providing assistance to the driver of the motor vehicle during the starting process according to claim 1, further comprising the step of, regardless of a value of the current holding torque when the vehicle is on a slope, always emitting the emitted signal, for indicating the need to engage the holding brake of the vehicle, above a certain limit value of the gradient.

8. The method for providing assistance to the driver of the motor vehicle during the starting process according to claim 1, further comprising the step of, when the vehicle is at rest, emitting the signal for indicating the need to use the holding brake of the vehicle as soon as a gear has been engaged or called for, or regardless of the current gear or a shift process in the transmission.

* * * * *